(12) United States Patent
Kamata

(10) Patent No.: US 6,292,449 B1
(45) Date of Patent: Sep. 18, 2001

(54) OPTICAL DISK APPARATUS

(75) Inventor: Shigeyuki Kamata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/069,661

(22) Filed: Apr. 29, 1998

(30) Foreign Application Priority Data

May 8, 1997 (JP) .................................................. 9-118208

(51) Int. Cl.[7] ...................................................... G11B 7/00
(52) U.S. Cl. ................ 369/53.29; 369/59.2; 369/124.06; 369/32
(58) Field of Search .................................. 369/48, 54, 59, 369/60, 124.14

(56) References Cited

U.S. PATENT DOCUMENTS

| | | |
|---|---|---|
| 4,972,396 | 11/1990 | Rafner . |
| 5,886,967 | * 3/1999 | Aramaki .................................. 369/54 |
| 5,940,352 | * 8/1999 | Moriguchi ............................... 369/54 |

* cited by examiner

*Primary Examiner*—Nabil Hindi
(74) *Attorney, Agent, or Firm*—Brinks Hofer Gilson & Lione

(57) ABSTRACT

A disk is rotated by a spindle motor. The spindle motor is controlled such that the disk is rotated at a constant linear velocity (CLV) against a recording head. A signal read by a reproducing head is stored in a time-axis expansion and compression memory. When a signal is written into the time-axis expansion and compression memory and when a signal is read therefrom, the time axis of a signal read by the reproducing head is compressed or expanded according to the track position of the reproducing head so as to match the time axis obtained at a constant linear velocity.

2 Claims, 4 Drawing Sheets

OPTICAL DISK APPARATUS

BACKGROUND OF THE INVENTION

1. Field of the Invention

The present invention relates to an optical disk apparatus having a plurality of heads (multi-heads) which can move independently in the radial direction of an optical disk.

2. Description of the Related Art

As a conventional optical disk apparatus of this type, there has been proposed an optical disk apparatus having a plurality of heads which can move independently in the radial direction of an optical disk as disclosed in Japanese Unexamined Patent Publication No. 3-260918 or No. 4-61050. With this configuration, since each of the plurality of heads can access a different track on the optical disk, both read and write operations, a plurality of write operations, and a plurality of read operations can be performed for one optical disk at the same time.

Methods for performing read and write operations while an optical disk is rotating include a constant angular velocity (CAV) method and a constant linear velocity (CLV) method. The above conventional optical disk apparatus handles a CAV-method disk. Since the linear velocity of a disk against each head differs unless the plurality of heads are disposed on the same track in the CLV method, signals read by the heads, which do not access at a constant linear velocity, have been compressed or expanded in the time domain. Therefore, the multi-head method cannot be applied to a CLV-method disk.

SUMMARY OF THE INVENTION

Accordingly, it is an object of the present invention to provide an optical disk apparatus that allows the multi-head method, in which a plurality of heads independently access different tracks on an optical disk, to be applied to a CLV-method disk.

The foregoing object of the present invention is achieved through the provision of an optical disk apparatus including: a first head capable of moving in the radial direction of an optical disk; a second head which can be moved in the radial direction of the optical disk independently from the first head and which performs at least reproduction for the optical disk; disk-rotating means for rotating the optical disk at a constant linear velocity against the first head; and time-axis expansion and compression means for expanding and compressing the time axis of a signal read by the second head, according to the track position of the second head such that the time axis matches that obtained at a constant linear velocity.

An optical disk apparatus according to the present invention is configured such that the time axis of a signal read by a head which does not access at a constant linear velocity is compressed or expanded according to the track position of the head so as to match the time axis obtained at a constant linear velocity. With this configuration, since a signal compressed or expanded in the time domain by reading by the head which does not access at a constant linear velocity is corrected, the multi-head method, in which each of a plurality of heads independently accesses a different track, can be applied to a CLV-method disk.

The optical disk apparatus may be configured such that the first head serves for recording only and the second head serves for reproduction only. Both of these first and second heads may serve for recording and reproduction. In this case, the time-axis expansion and compression means needs to expand and compress the time axis of a signal read by a head performing reproduction, according to the track position of the head such that the time axis matches that obtained at a constant linear velocity.

DESCRIPTION OF THE PREFERRED EMBODIMENT

Figure 1:
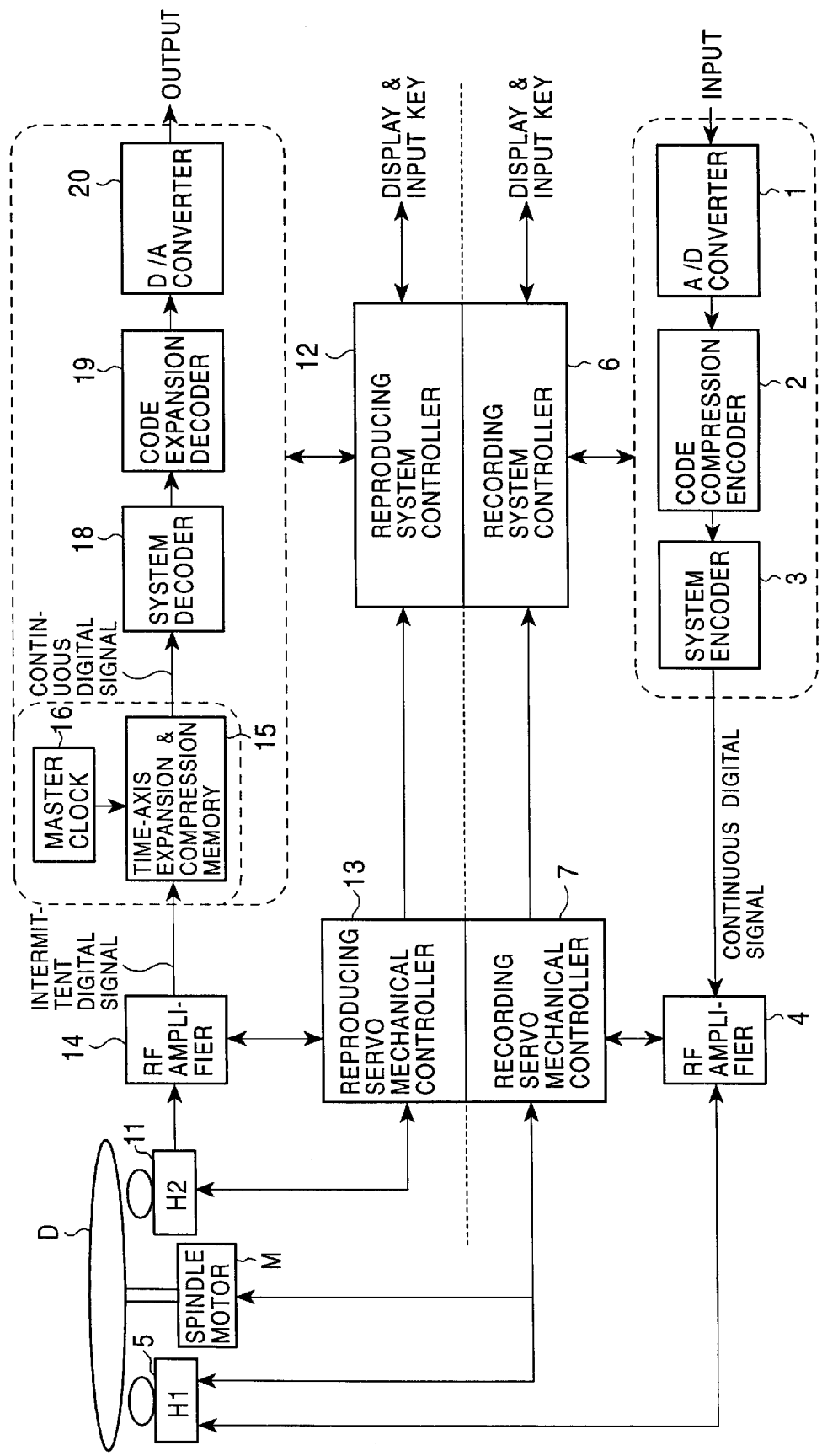
FIG. 1 is a block diagram of an optical disk apparatus according to an embodiment of the present invention.
Figure 2:
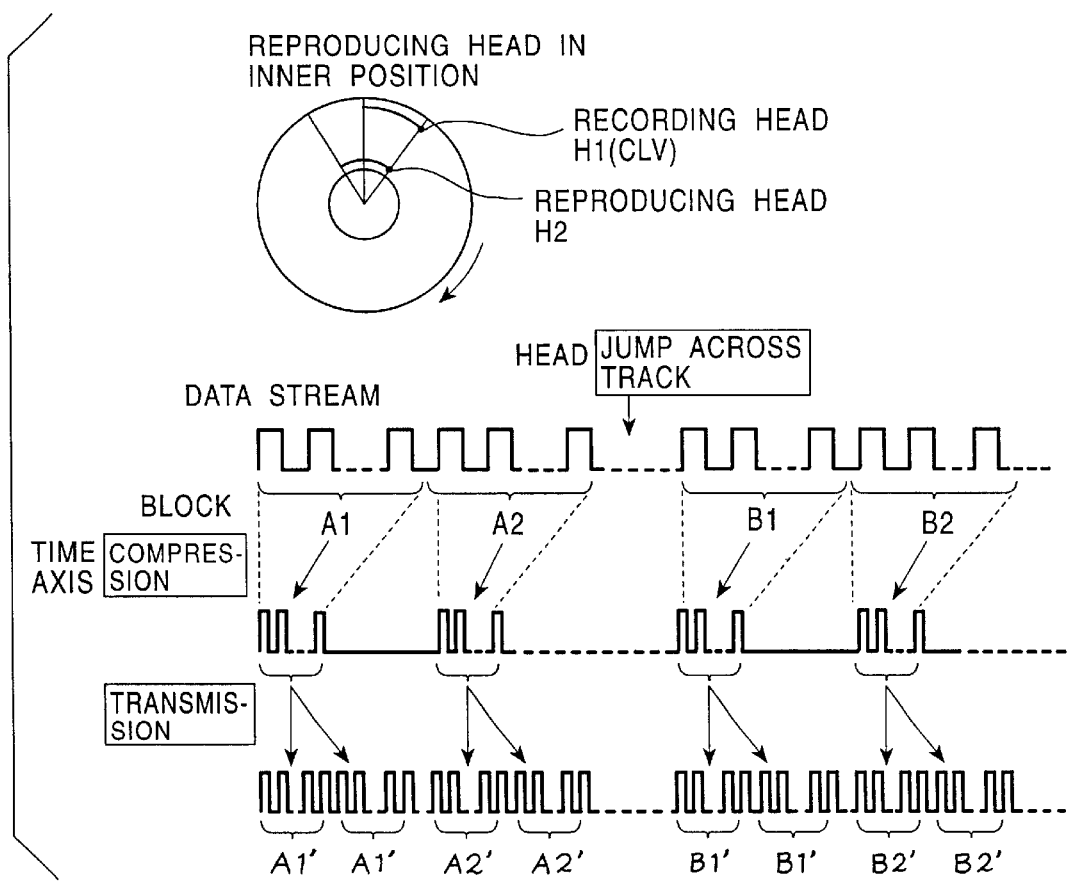
FIG. 2 is a timing chart illustrating main signals of a reproducing system, obtained when the reproducing head shown in FIG. 1 is disposed at an inner position than a recording head in the radial direction.
Figure 3:
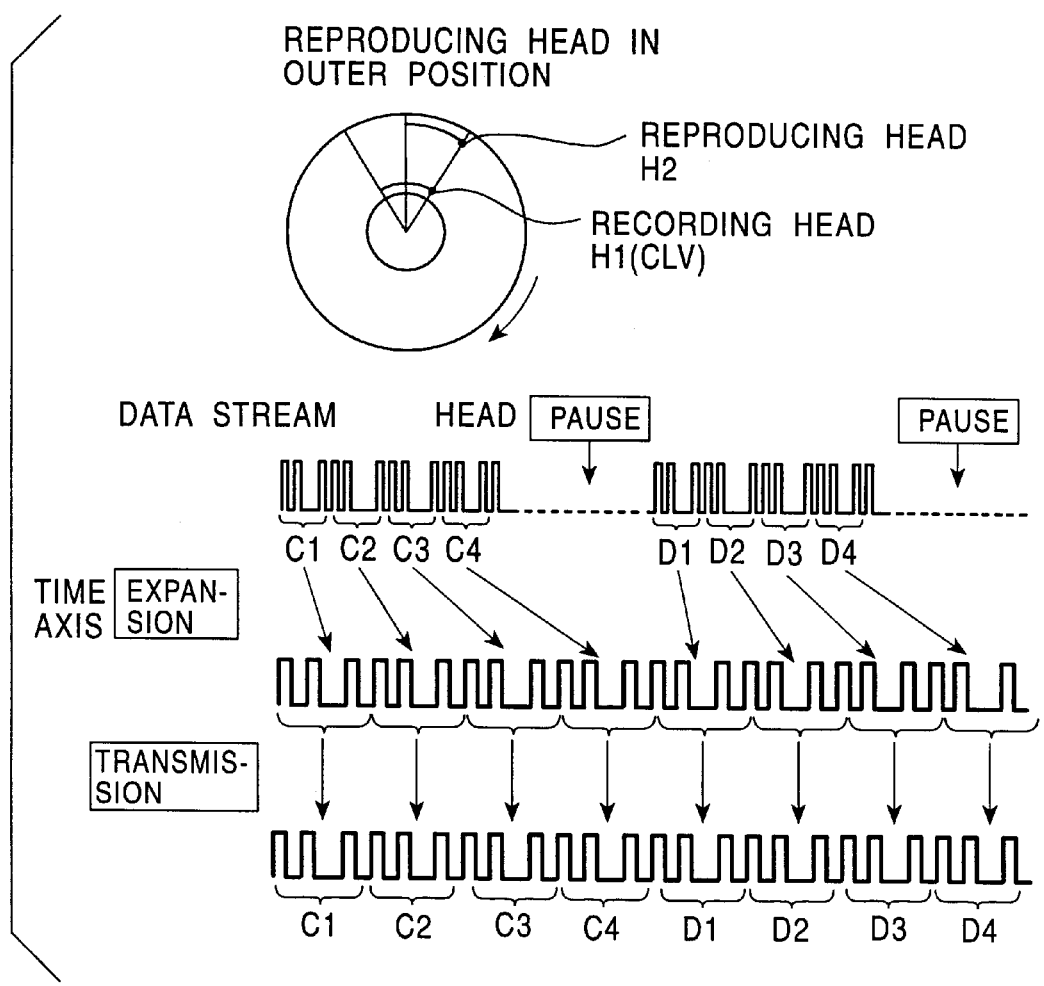
FIG. 3 is a timing chart illustrating main signals of a reproducing system, obtained when the reproducing head shown in FIG. 1 is disposed at an outer position than the recording head in the radial direction

Embodiments will be described below by referring to the drawings. FIG. 1 is a block diagram of an optical disk apparatus according to an embodiment of the present invention. FIG. 2 is a timing chart of main signals obtained in a reproducing system when the reproducing head shown in FIG. 1 is disposed at an inner position than a recording-head in the radial direction. FIG. 3 is a timing chart of main signals obtained in a reproducing system when the reproducing head shown in FIG. 1 is disposed at an outer position than the recording head in the radial direction.

FIG. 1 shows an optical disk apparatus having a recording head H1 and a reproducing head H2. The upper portion in FIG. 1 illustrates a reproducing system and the lower portion illustrates a recording system. An input signal to be recorded, such as an image signal and a sound signal, is converted to a digital signal by an A/D converter 1, and the digital signal is compressed in its amount by a code compression encoder 2. An error correction code is added to the compressed data by a system encoder 3. The compressed data is also formatted and EFM-modulated, and output as a continuous digital signal. This continuous digital signal is applied to a recording actuator/pickup 5 (recording head H1) through a recording RF amplifier 4 and recorded in a disk D.

The disk D is rotated by a spindle motor M. The spindle motor M is controlled by a recording system controller 6 and a recording servo mechanical controller 7 such that the disk D is rotated at a constant linear velocity (CLV) against the recording head H1. The recording actuator/pickup 5 is configured such that it can be moved in the radial direction of the disk D by the recording mechanical controller 7 and its objective can be moved in the radial direction and the optical-axis direction.

A reproducing actuator/pickup 11 (reproducing head H2) is configured independently from the recording actuator/pickup 5 such that it can be moved in the radial direction of the disk D by a reproducing system controller 12 and a reproducing mechanical controller 13 and its objective can be moved in the radial direction and the optical-axis direction.

A signal read by the reproducing head H2 is amplified by a reproducing RF amplifier 14 and output as an intermittent digital signal. This intermittent digital signal is stored in a time-axis expansion and compression memory 15. A master clock 16 is applied to the time-axis expansion and compression memory 15. The channel clock period of the intermittent digital signal is controlled so as to match the master clock period. A continuous digital signal is read from the time-axis expansion and compression memory 15, and EFM-demodulated, de-formatted, and error-corrected by a system decoder 18. The signal is then expanded by a code expansion decoder 19, and converted to an analog signal by a D/A converter 20.

FIG. 2 shows a condition in which the reproducing head H2 is disposed at an inner position than the recording head H1 in the radial direction. In this case, since the disk D is rotating at a constant linear velocity against the recording head H1, the linear velocity against the reproducing head H2 is smaller than that against the recording head H1. Therefore, the time axis (blocks A1, A2, B1, and B2 in the figure) of a signal read by the reproducing head H2 is longer than that obtained at a constant linear velocity. The reproducing head H2 is controlled so as to jump a track (track jump) according to the track position of the reproducing head H2 such that the time axis of a signal read by the reproducing head H2 matches that obtained at a constant linear velocity. At the same time, the time axis is compressed when a signal is written into the time-axis expansion and compression memory 15 and when a signal is read therefrom.

FIG. 3 shows a condition in which the reproducing head H2 is disposed at an outer position than the recording head H1 in the radial direction. In this case, since the disk D is rotating at a constant linear velocity against the recording head H1, the linear velocity against the reproducing head H2 is larger than that against the recording head H1. Therefore, the time axis (blocks C1, C2, C3, C4, D1, D2, D3, and D4 in the figure) of a signal read by the reproducing head H2 is shorter than that obtained at a constant linear velocity. The reproducing head H2 is controlled so as to pause according to the track position of the reproducing head H2 such that the time axis of a signal read by the reproducing head H2 matches that obtained at a constant linear velocity. At the same time, the time axis is expanded when a signal is written into the time-axis expansion and compression memory 15 and when a signal is read therefrom.

In the above embodiment, to simplify the description, the recording head H1 and the reproducing head H2 are provided. The present invention can also be applied to a case in which, for example, two or more reproducing heads are provided. In this case, a disk is driven at a constant linear velocity against one reproducing head, the time axis of a signal read by the reproducing head is neither expanded nor compressed, and the time axis of a signal read by the other head is expanded or compressed. The multi-head method can be applied to a CLV-method disk in this way.

Figure 4:
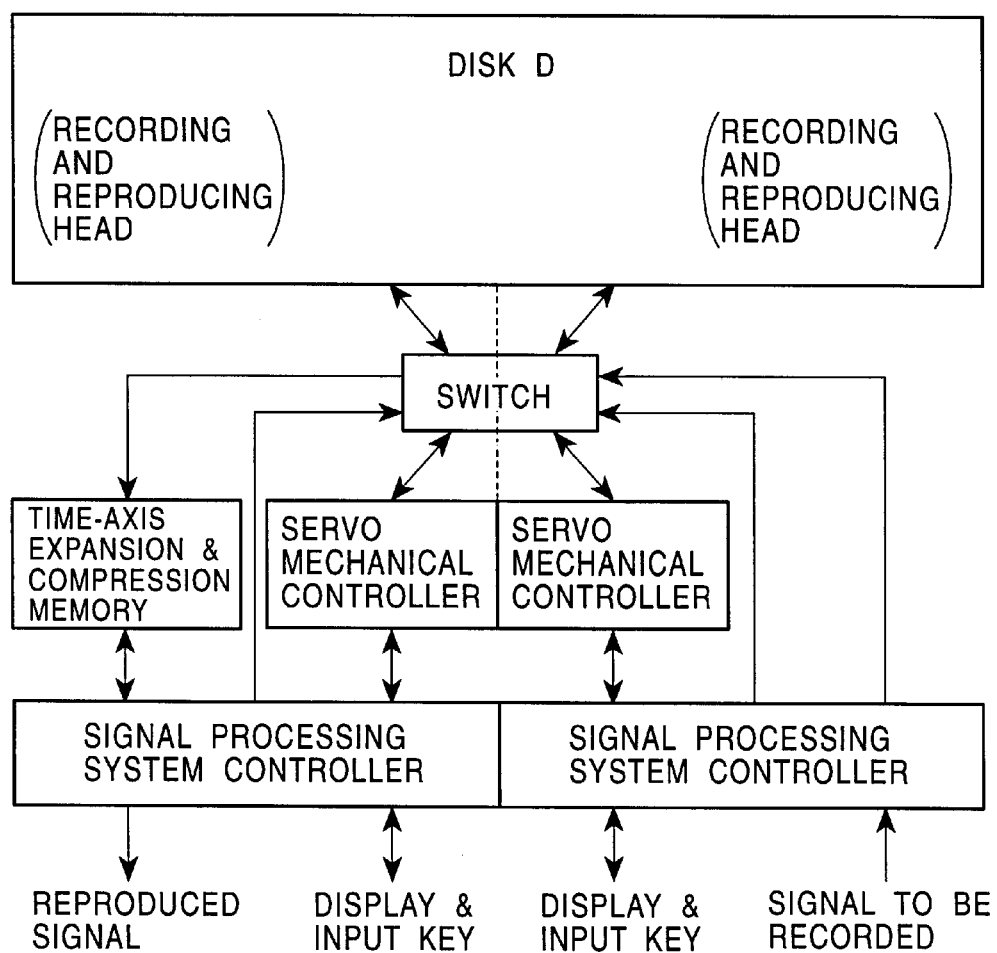
FIG. 4 is a block diagram of an optical disk apparatus according to another embodiment of the present invention.

FIG. 4 is a block diagram of an optical disk apparatus according to another embodiment of the present invention. In this embodiment, recording/reproducing heads which perform recording and reproducing are used as first and second heads and a switch SW is used to specify whether each head performs recording or reproducing. Also in this case, the disk D is rotated at a CLV against the head which performs recording, and the time axis of a signal read by the recording/reproducing head which performs reproduction is compressed or expanded according to the track position of the recording/reproducing head such that the period of the signal read by the recording/reproducing head matches that of a signal obtained at a certain linear velocity. The optical disk apparatus shown in FIG. 4 may be configured such that two sets of the time-axis expansion and compression memories and other circuits are provided and the time axis is compressed or expanded only when a signal is written into a time-axis expansion and compression memory for reproduction or only when a signal is read from the time-axis expansion and compression memory.

What is claimed is:

1. An optical disk apparatus comprising:

a first head capable of moving in the radial direction of an optical disk;

a second head which can be moved in the radial direction of the optical disk independently from said first head and which performs at least reproduction for the optical disk;

a disk-rotating mechanism for rotating the optical disk at a constant linear velocity with respect to said first head;

a time-axis expansion and compression adjuster for expanding and compressing the time axis of a signal read by said second head, according to the track position of said second head such that the time axis matches that obtained at a constant linear velocity; and a time-axis expansion and compression memory provided in said time-axis expansion and compression adjuster that temporarily stores therein a signal read by said second head in order to expand or compress the pulse width of the signal read by said second head correspondingly to the time axis obtained at a constant linear velocity, wherein when second head is positioned radially inside of said first head, said second head is controlled so as to jump a track according to the track position of said second head, and the pulse width of a signal read by said second head is compressed with the use of the time-axis expansion and compression memory such that the time axis of the signal read by said second head matches that obtained at a constant linear velocity, and when second head is positioned radially outside of said first head, said second head is temporarily stopped according to the track position of said second head, and the pulse width of a signal read by said second head is expanded with the use of the time-axis expansion and compression memory such that the time axis of the signal read by said second head matches that obtained at a constant linear velocity.

2. An optical disk apparatus according to claim 1, wherein both said first head and said second head serve for recording and reproduction and are provided with switches for switching said first and second head between recording and reproduction, respectively, and said time-axis expansion and compression adjuster expands and compresses the time axis of a signal read by said second head according to the track position of said second head such that the time axis matches that obtained at a constant linear velocity when said second head is switched to serve for reproduction.

* * * * *